United States Patent
Hjerpe

(10) Patent No.: US 8,353,485 B2
(45) Date of Patent: Jan. 15, 2013

(54) SYSTEM FOR HOLDING CABLES, HOSES, TUBES OR THE LIKE

(75) Inventor: Joakim Hjerpe, Mora (SE)

(73) Assignee: Mora Contract Manufacturing AB, Mora (SE)

( * ) Notice: Subject to any disclaimer, the term of this patent is extended or adjusted under 35 U.S.C. 154(b) by 0 days.

(21) Appl. No.: 13/002,798

(22) PCT Filed: Jun. 8, 2009

(86) PCT No.: PCT/SE2009/050685
§ 371 (c)(1),
(2), (4) Date: Jan. 6, 2011

(87) PCT Pub. No.: WO2010/005367
PCT Pub. Date: Jan. 14, 2010

(65) Prior Publication Data
US 2011/0114802 A1 May 19, 2011

(30) Foreign Application Priority Data
Jul. 8, 2008 (SE) ........................................ 0801643

(51) Int. Cl.
*F16L 3/22* (2006.01)
(52) U.S. Cl. .................... 248/68.1; 248/67.7; 248/74.1; 211/59.4; 211/182
(58) Field of Classification Search ................. 248/68.1, 248/65, 67.5, 67.7, 74.1, 74.4, 74.5, 74.2; 211/59.4, 70.4, 182
See application file for complete search history.

(56) References Cited

U.S. PATENT DOCUMENTS

| | | | |
|---|---|---|---|
| 3,521,332 A * | 7/1970 | Kramer | 403/188 |
| 4,199,070 A | 4/1980 | Magnussen, Jr. | |
| 4,244,542 A * | 1/1981 | Mathews | 248/49 |
| 4,306,697 A * | 12/1981 | Mathews | 248/68.1 |
| 5,104,072 A | 4/1992 | Kuo | |
| 5,257,768 A * | 11/1993 | Juenemann et al. | 248/604 |
| 5,263,671 A * | 11/1993 | Baum | 248/68.1 |
| 5,669,590 A * | 9/1997 | Przewodek | 248/68.1 |
| 6,007,029 A * | 12/1999 | Barriger et al. | 248/68.1 |
| 6,354,543 B1 * | 3/2002 | Paske | 248/68.1 |
| 6,523,790 B2 * | 2/2003 | Sentpali et al. | 248/68.1 |
| 6,889,305 B2 * | 5/2005 | Adelmann | 711/170 |
| 6,899,304 B2 * | 5/2005 | Bellmore et al. | 248/65 |

(Continued)

FOREIGN PATENT DOCUMENTS

AU 585155 11/1988

(Continued)

*Primary Examiner* — Terrell McKinnon
*Assistant Examiner* — Monica Millner
(74) *Attorney, Agent, or Firm* — Dilworth & Barrese, LLP.

(57) ABSTRACT

The invention relates to a system for holding elongated objects, which system comprises holder modules (1), each of which being provided with at least one seat (3) with an arched shape intended to receive an elongated object. The holder modules are provided with mutually co-operating coupling members (5a, 5b) for coupling together two holder modules with each other. A first coupling member comprises an elongated projection, which is tapered in its longitudinal direction and which has a dovetail shaped cross-sectional shape. A second coupling member comprises a groove (7) with a dovetail-shaped cross-sectional shape, which groove fits to the projection and is tapered in its longitudinal direction. The projection is insertable into the groove and displaceable to a locking engagement in the groove under gradual reduction of the play between the two holder modules when the projection is displaced into the groove.

20 Claims, 3 Drawing Sheets

U.S. PATENT DOCUMENTS

| | | | |
|---|---|---|---|
| 7,007,900 B2* | 3/2006 | Goodwin et al. | 248/68.1 |
| 7,097,142 B1* | 8/2006 | Schmidt | 248/68.1 |
| 7,207,528 B2* | 4/2007 | Kato | 248/55 |
| 7,294,789 B1* | 11/2007 | Watthanasintham | 174/135 |
| 7,484,698 B2* | 2/2009 | Budagher | 248/68.1 |
| 2002/0005463 A1* | 1/2002 | Paske et al. | 248/74.1 |
| 2003/0089829 A1* | 5/2003 | Brandzel et al. | 248/68.1 |
| 2007/0246616 A1 | 10/2007 | Budagher | |

FOREIGN PATENT DOCUMENTS

| | | |
|---|---|---|
| CH | 573672 | 3/1976 |
| GB | 2165099 | 4/1986 |
| SU | 580387 | 11/1977 |
| WO | 9956368 | 11/1999 |

* cited by examiner

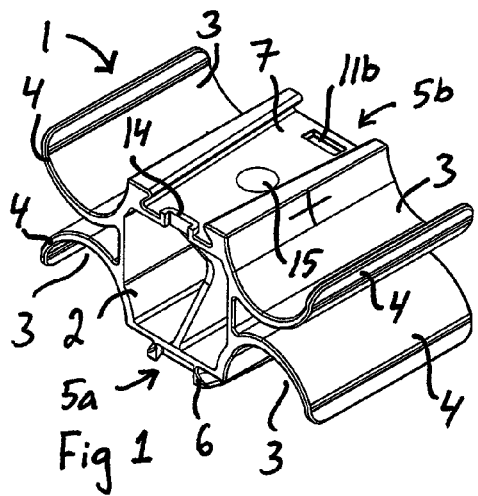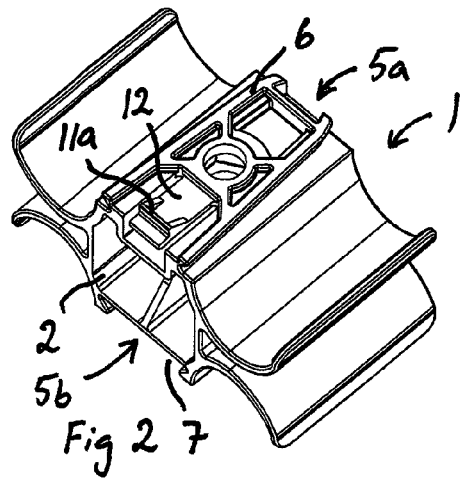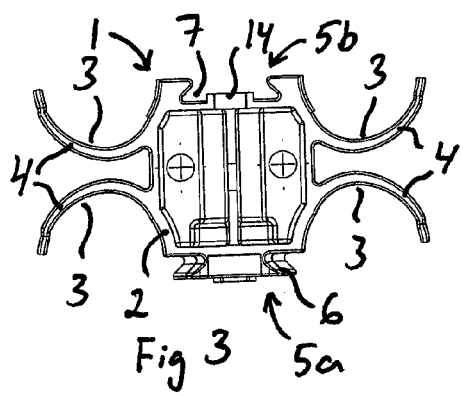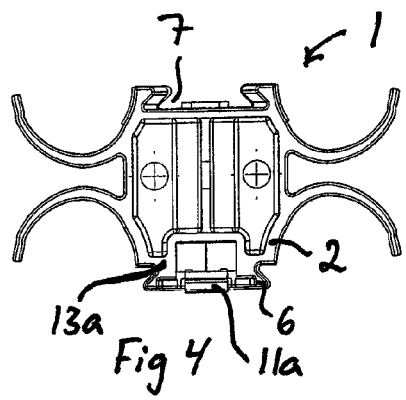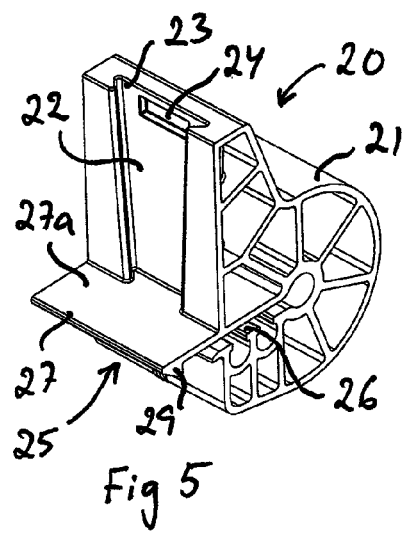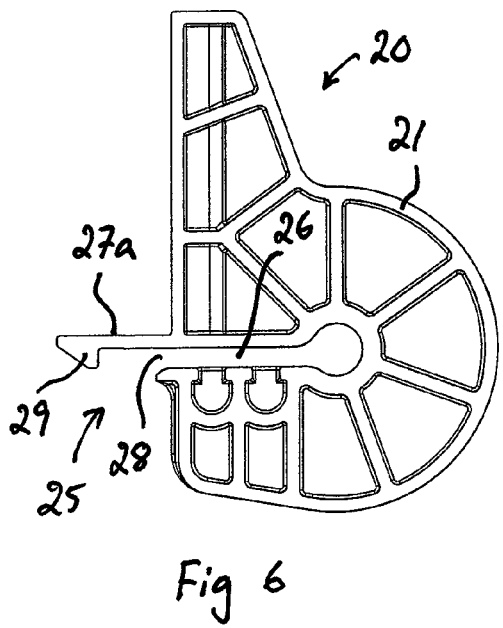

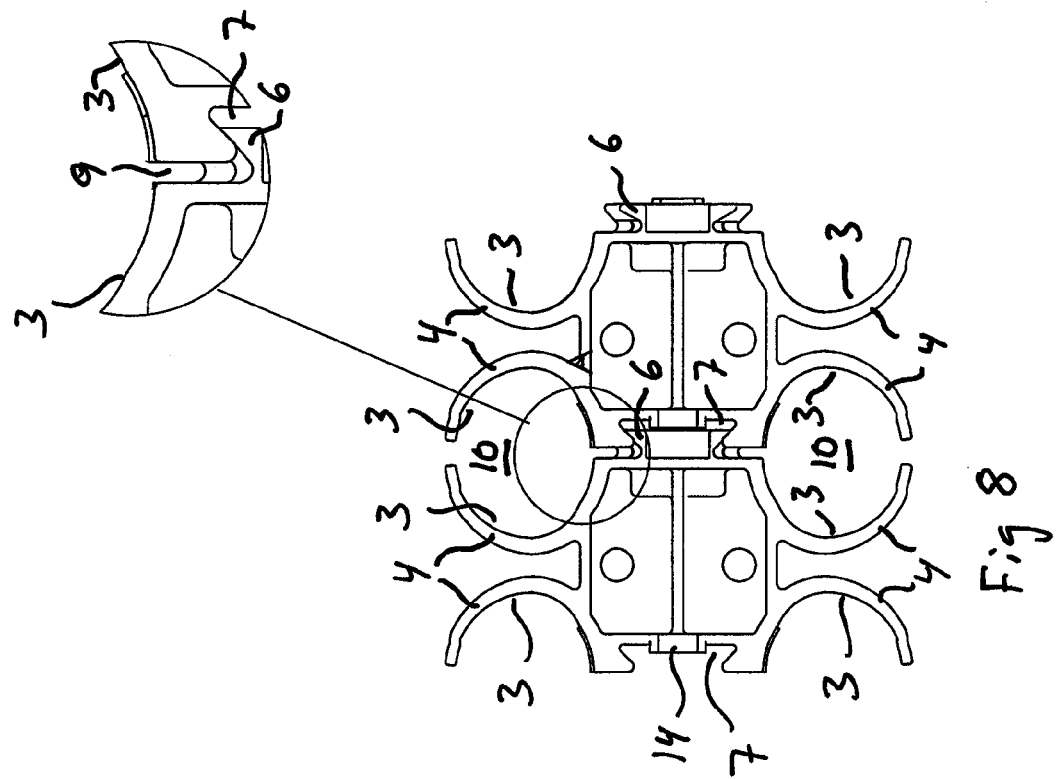
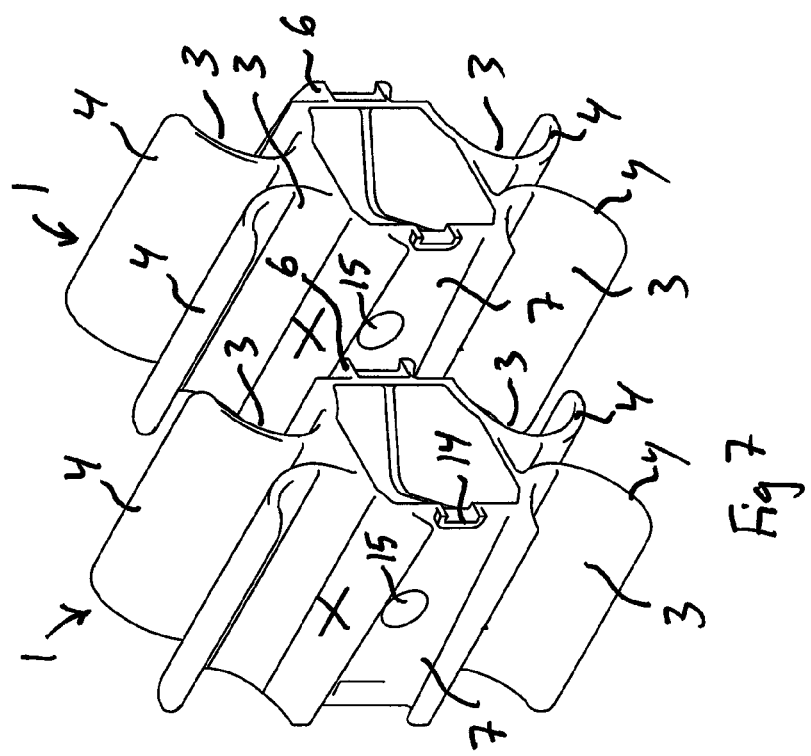

SYSTEM FOR HOLDING CABLES, HOSES, TUBES OR THE LIKE

FIELD OF THE INVENTION AND PRIOR ART

The present invention relates to a system for holding elongated objects in the form of cables, hoses, tubes or the like.

In many constructions there is a need to fix cables, hoses, tubes or the like to a supporting structural element. Several different types of holder systems have been developed over the years for this purpose, but there is still a need for a simple and appropriate holder system that makes it possible to fasten elongated objects in the form of cables, hoses, tubes or the like in a simple and rapid manner so as to thereby allow these objects to be fixed to a supporting structural element with a minimal risk of detrimental deformation of the objects.

OBJECT OF THE INVENTION

The object of the present invention is to provide a new holder system for holding elongated objects in the form of cables, hoses, tubes or the like, with a design and function which in at least some aspect offers an advantage as compared to previously known holder systems of the type here in question.

SUMMARY OF THE INVENTION

According to the present invention, said object is achieved by a system having the features herein.

The holder system according to the invention comprises two or more holder modules, each of which being provided with at least one seat with an arched shape intended to receive an elongated object, the holder modules being provided with mutually co-operating coupling members for coupling together two holder modules with each other while clamping an elongated object between two opposite seats of these two holder modules. These coupling members are designed for coupling together two holder modules by a mutual displacement of the holder modules in a direction essentially parallel with the longitudinal axes of the seats of the holder modules. A first one of said mutually co-operating coupling members comprises an elongated projection with a dovetail-shaped cross-sectional shape, this projection being arranged with its longitudinal axis extending essentially in parallel with the longitudinal axis of the respective seat of the associated holder module and being tapered in its longitudinal direction as seen in the direction from a first end of the projection to the opposite second end of the projection. A second one of said mutually co-operating coupling members comprises a groove, which fits to said projection and which has a dovetail-shaped cross-sectional shape, this groove being arranged with its longitudinal axis extending essentially in parallel with the longitudinal axis of the respective seat of the associated holder module and being tapered in its longitudinal direction as seen in the direction from a first end of the groove to the opposite second end of the groove. Said projection is insertable into said groove by insertion of the narrower second end of the projection into an opening at the wider first end of the groove and displaceable to a locking engagement in the groove under gradual reduction of the play between the two holder modules when the projection is displaced into the groove.

With the system according to the invention, it will be possible to clamp one or more elongated objects in the form of cable, hose, tube or the like between two holder modules without requiring any time-consuming tightening of fastening members in the form of screws, bolts or the like. Owing to the fact that the mutually complementary coupling members with dovetail-shaped cross-section are tapered in the longitudinal direction, it is also obtained the advantage that the play, which initially exists between two holder modules when the projection of one holder module has been pushed a short distance into the groove of the other holder module, gradually will be reduced when the projection is pushed further and further into the groove up to an end position in which the projection is wedged in the groove. The clamping force exerted by the opposite seats of the holder modules against the envelope surface of an object extending between the seats, for instance a cable, will increase when the play between the holder modules is reduced and will not assume its final value until the moment when the projection reaches its wedging end position in the groove. Hereby, the coupling together of the holder modules is facilitated, at the same time as the risk of wear damages to the envelop surface of the object is limited.

According to an embodiment of the invention, the respective holder module is provided with a first coupling member in the form of a projection with the above-mentioned design on a first side of a body included in the holder module, and a second coupling member in the form of a groove with the above-mentioned design on an opposite second side of the body. Hereby, two or more identically designed holder modules can be coupled together with each other in a row in order to hold an optional number of elongated objects.

According to another embodiment of the invention, the coupling members are provided with mutually co-operating snap-in members in order to allow a coupling member of a holder module to engage with snap-in action in the corresponding coupling member of another holder module by means of said mutually co-operating snap-in members. Hereby, a reliable coupling together of the holder modules is achieved.

According to another embodiment of the invention, the respective holder module comprises two seats which are arranged on a first side of a body included in the holder module and which face away from each other, and two seats which are arranged on the opposite side of the body and which face away from each other.

Hereby, it will be possible to fasten two elongated objects between every pair of mutually interconnected holder modules, whereby the number of holder modules require to be used for fastening a certain number of elongated objects is reduced.

According to another embodiment of the invention, the respective seat is formed by a resilient, curved tongue, which projects laterally from a body included in the holder module. Hereby, the obtainment of a predetermined clamping force against the elongated objects to be fastened between the holder modules is facilitated, at the same time as the tolerance requirements with respect to the adaptation of the seats to the diameter of the elongated objects to be fastened are reduced. Owing to the fact that the seats are resilient, the risk of damages to the envelop surfaces of the objects is reduced in connection with the coupling together of the holder modules.

According to another embodiment of the invention, the system comprises a mounting module, which comprises:
- a clamping mechanism for clamping the mounting module to a supporting structural element, and
- a groove, which fits to said projection and which has a dovetail-shaped cross-sectional shape, this groove being tapered in its longitudinal direction as seen in the direction from a first end of the groove to the opposite second end of the groove, said projection being insertable into this groove by insertion of the narrower second end of the projection into an opening at the wider first end of the groove and displaceable into a locking engagement in the groove.

Hereby, a set of mutually interconnected holder modules may in a simple manner be fixed to the mounting module in order to be supported by a supporting structural element through the mounting module.

According to another embodiment of the invention, the clamping mechanism of the mounting module comprises a resilient locking tongue, which projects from a body included in the mounting module at the narrower second end of the groove essentially perpendicularly to the longitudinal direction of the groove and which at its outer end is provided with a downwardly directed locking shoulder for locking engagement with a supporting structural element, the groove and locking tongue of the mounting module being so designed that a gable of a holder module abuts against the upper side of the locking tongue when the holder module is connected to the mounting module with the projection of the holder module in locking engagement with the groove of the mounting module so that the holder module thereby obstructs a bending of the locking tongue upwards in relation to the body of the mounting module. The holder module that is coupled together with the mounting module will hereby contribute to secure the mounting module to a supporting structural element.

Other features and advantages of the system according to the invention will appear from the following description.

BRIEF DESCRIPTION OF THE DRAWINGS

The invention will in the following be more closely described by means of embodiment examples, with reference to the appended drawings. It is shown in:

FIGS. 1 and 2 perspective views from two different directions of a holder module included in a system according to the present invention, FIGS. 3 and 4 lateral views from two different directions of the holder module of FIG. 1, FIG. 5 a perspective view of a mounting module included in a system according to the present invention, FIG. 6 a lateral view of the mounting module of FIG. 5, FIG. 7 a perspective view of two holder modules in a partly assembled position, FIG. 8 a lateral view of the holder modules of FIG. 7, and FIGS. 9-11 three cables fixed to an angle bar by means of a system according to the present invention.

DETAILED DESCRIPTION OF PREFERRED EMBODIMENTS

Figure 11:
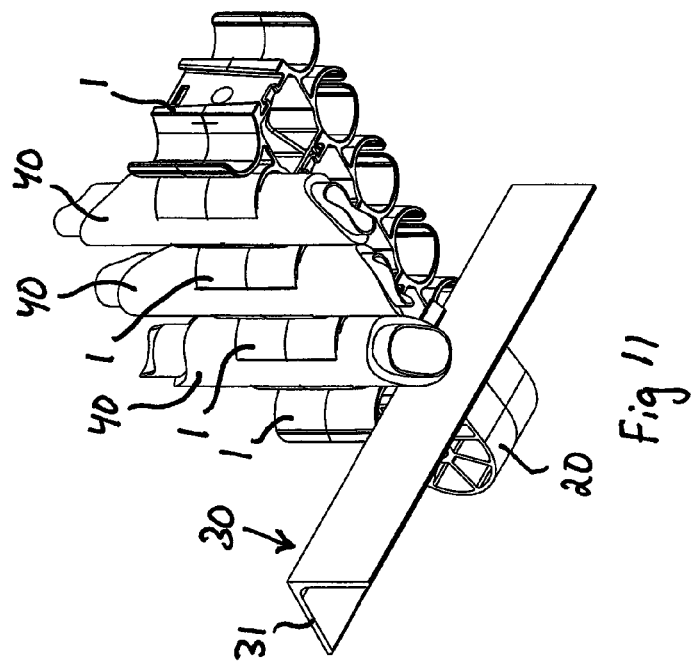

A holder module 1 included in a system according to the present invention is illustrated in FIGS. 1-4. The holder module 1 comprises a body 2 and four seats 3 with an arched shape, which are attached to the body and which extend in the longitudinal direction of the holder module. The respective seat 3 has an arc-shaped profile in order to essentially conform to the envelop surface of a round, elongated object that is intended to be received in the seat. Said object may for instance be a cable, a hose, a tube or the like. Two seats 3, which face away from each other, are arranged opposite each other on a first side of the body 2, and two seats 3, which face away from each other, are arranged opposite each other on the opposite side of the body 2. In the illustrated example, the respective seat 3 is formed by a resilient, curved tongue 4, which projects laterally from the body 2.

The holder module 1 is provided with coupling members 5a, 5b, each of which being capable of being coupled together with a corresponding coupling member 5b, 5a of another holder module of the same type so as to thereby allow mutual coupling together of individual holder modules 1 of the same type in a row with the seats 3 of the interconnected holder modules extending in parallel with each other. The coupling members 5a, 5b are designed for coupling together of two holder modules 1 with each other by a mutual displacement of the holder modules in a direction essentially parallel with the longitudinal axes of the seats 3 of the holder modules.

The holder module 1 is provided with a first coupling member 5a on a first side of the body 2 and a second coupling member 5b on an opposite second side of the body. The first coupling member 5a comprises an elongated projection 6 with dovetail-shaped cross-sectional shape. This projection 6 is arranged with its longitudinal axis extending essentially in parallel with the longitudinal axis of the respective seat 3 and is tapered in its longitudinal direction as seen in the direction from a first end of the projection 6 to the opposite second end of the projection. The second coupling member 5b comprises a groove 7, which fits to the projection 6 and which has a dovetail-shaped cross-sectional shape. This groove 7 is arranged with its longitudinal axis extending essentially in parallel with the longitudinal axis of the respective seat 3 and is tapered in its longitudinal direction as seen from a first end of the groove 7 to the opposite second end of the groove. In the illustrated example, the projection 6 as well as the groove 7 extends over the entire axial length of the body 2.

The projection 6 of the holder module is insertable into the groove 7 of another holder module of the same type by insertion of the narrower second end of the projection 6 into an opening at the wider first end of the groove 7, and it is displaceable to a locking engagement in the groove under gradual reduction of the play between the two holder modules and gradually increasing wedging action between the projection 6 and the groove 7 when the projection is displaced into the groove. FIGS. 7 and 8 illustrate a position during the coupling together of two holder modules 1 when the projection 6 of one holder module has been pushed approximately half-way into the groove 7 of the other holder module. The play 9, which exists between the two holder modules when in this position, appears from the detail enlargement in FIG. 8. When the projection 6 has been pushed fully into the groove 7 to a locking engagement therein, this play will be eliminated so that the two holder modules abut firmly against each other. An elongated object (not shown in FIGS. 7 and 8) is intended to be received in the space 10 between two opposite seats 3 of the two interconnected holder modules in order to be clamped between these seats.

By the wedging action between the co-operating coupling members 5a, 5b of the mutually interconnected holder modules 1, the holder modules are prevented from being drawn apart from each other in the longitudinal direction, and by positive locking between the co-operating coupling members 5a, 5b of the mutually interconnected holder modules 1, the holder modules are prevented from being drawn apart from each other in the cross-direction.

The coupling members 5a, 5b are provided with mutually co-operating snap-in members 11a, 11b in order to allow a coupling member 5a of a holder module to engage with snap-in action in the corresponding coupling member 5b of another holder module by means of said mutually co-operating snap-in members. Hereby, it will be possible to further increase the resistance against a separation of two interconnected holder modules 1. In the illustrated example, one snap-in member 11a consists of an outwardly facing locking shoulder arranged on a resilient tongue 12 of the projection 6 at the wider first end of the projection, whereas the other snap-in member 11b consists of a recess arranged in the bottom of the groove 7 at the wider first end of the groove. The locking shoulder 11a is arranged to come into engagement in the recess 11b when the projection 6 has been pushed into its end position in the groove 7. The tongue 12 is accessible from a gable 13a of the holder module, whereby the locking shoulder 11a in a simple manner can be released from the recess 11b when two interconnected holder modules are to be released from each other.

In the illustrated example, a stop lug 14 is arranged at the narrower second end of the groove 7 in order to prevent the projection 6 of a holder module from being displaced to far into the groove 7 of another holder module in connection with the coupling together of the two holder modules.

In the illustrated example, the holder module 1 is provided with a through hole 15, which is designed to receive a bolt or screw in order to fix the holder module to a supporting structural element. This hole 15 is arranged in the centre of the holder module so that the holes of two mutually interconnected holder modules will be in line with each other.

The system according to the invention may also comprise a mounting module 20 (see FIGS. 5 and 6), which is designed to cooperate with a holder module 1 of the type described above. The mounting module 20 comprises a body 21. A groove 22 which fits to the projection 6 of the holder module 1 and which has a dovetail-shaped cross-sectional shape is arranged in the body. This groove 22 is tapered in its longitudinal direction as seen from a first end of the groove 22 to the opposite second end of the groove. The projection 6 of a holder module is insertable into this groove 22 by insertion of the narrower second end of the projection 6 into an opening 23 at the wider first end of the groove 22 and displaceable to a locking engagement in the groove in the same manner as described above with respect to the coupling together of two holder modules 1. A recess 24 is arranged in the bottom of the groove 22 at the wider first end of the groove. This recess 24 is adapted to the locking shoulder 11a of the projection 6 of the holder module. The locking shoulder 11a is arranged to come into engagement in the recess 24 when the projection 6 has been pushed into its end position in the groove 22.

The mounting module 20 further comprises a clamping mechanism 25 for clamping the mounting module to a supporting structural element. In the example illustrated in FIGS. 5 and 6, the clamping mechanism is designed for clamping to a supporting structural element in the form of an angle bar 30 (see FIGS. 9-11) and comprises a slot 26, which is designed to receive one of the strips 31 of an angle bar. This clamping mechanism 25 further comprises a resilient locking tongue 27, which projects from the body 21 of the mounting module at the narrower second end of the groove 22 essentially perpendicularly to the longitudinal direction of the groove. The locking tongue 27 is at its inner end connected to the opening 28 of the slot 26 and is at its outer end provided with a downwardly directed locking shoulder 29 for locking engagement with the angle bar 30. The groove 22 and the locking tongue 27 are so designed that a gable 13b of a holder module 1 will abut against the upper side 27 of the locking tongue when the holder module is coupled together with the mounting module 20 with the projection 6 of the holder module in a locking engagement with the groove 22 of the mounting module, so that the holder module 1 thereby obstructs a bending of the locking tongue 27 upwards in relation to the body 21 of the mounting module. The holder module 1 will hereby secure that the locking shoulder 29 is retained in a locking engagement with the iron bar 30. The distance between the locking shoulder 29 and the bottom of the slot 26 is essentially to correspond to the width of the strip 31 of the angle bar so that the mounting module 20 can be anchored firmly to the iron bar.

Figure 9:
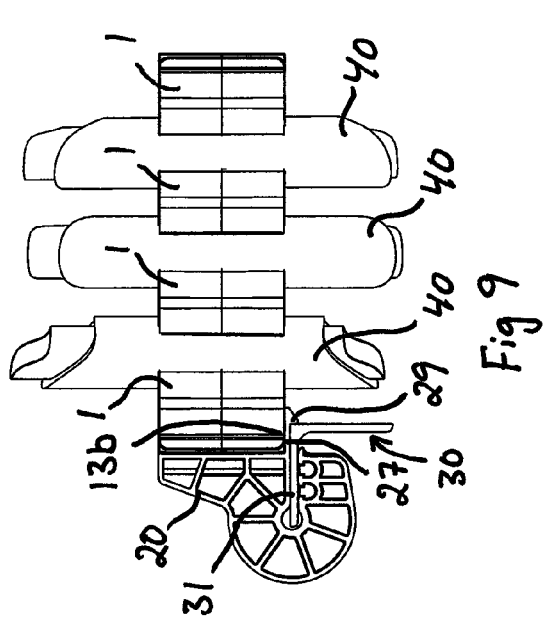
Figure 10:
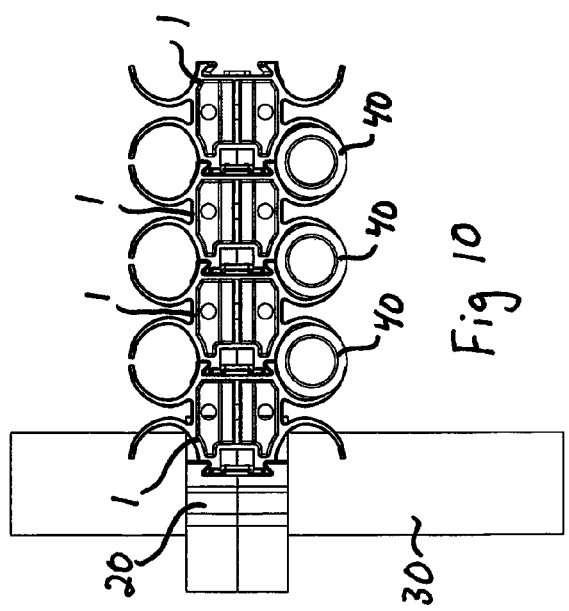

FIGS. 9-11 show three cables 40, which are fixed to a supporting structural element in the form of an angle bar 30 by means of four holder modules 1 of the type described above and a mounting module 20 of the type described above. The respective cable 40 is clamped between two opposite seats 3 of two mutually interconnected holder modules 1. The innermost holder module 1 is through its projection 6 fixed to the mounting module 20, which in its turn is clamped to the iron bar 30.

The holder modules 1 and the mounting module 20 are suitably made of plastic material.

The system according to the invention is well suited for holding thick cables.

The invention is of course not in any way limited to the embodiments described above. On the contrary, several possibilities to modifications thereof should be apparent to a person skilled in the art without departing from the basic idea of the invention as defined in the appended claims.

The invention claimed is:

1. A system for holding elongated objects in the form of cables, hoses, or tubes, which system comprises two or more separate, unattached holder modules (1), each of which being provided with at least two seats (3) extending outwardly from said holder modules (1), each with an arched shape intended to receive an elongated object, the holder modules (1) each being provided with mutually co-operating coupling members (5a, 5b) on opposite sides of each said holder module (1) and directly opposite one another in a direction substantially perpendicular to the longitudinal axis of each said holder (1) for coupling together two holder modules with each other while clamping an elongated object between two opposite seats (3) of these two holder modules, the coupling members (5a, 5b) coupling together two holder modules by a mutual displacement of the holder modules in a direction essentially parallel with the longitudinal axes of the seats (3) of the holder modules, wherein a first one of said mutually co-operating coupling members (5a) comprises an elongated projection (6) with a dovetail-shaped cross-sectional shape, this projection being arranged with its longitudinal axis extending essentially in parallel with the longitudinal axis of the respective seat (3) of the associated holder module and being tapered in its longitudinal direction as seen in the direction from a first end of the projection (6) to the opposite second end of the projection;

a second one of said mutually co-operating coupling members (5b) comprises a groove (7), which fits to said projection (6) and which has a dovetail-shaped cross-sectional shape, this groove being arranged with its longitudinal axis extending essentially in parallel with the longitudinal axis of the respective seat (3) of the associated holder module and being tapered in its longitudinal direction as seen in the direction from a first end of the groove (7) to the opposite second end of the groove; and said projection (6) is inserted into said groove (7) by insertion of the narrower second end of the projection (6) into an opening at the wider first end of the groove (7) and gradually slid along the respective longitudinal axes to a locking engagement in the groove under gradual reduction of the play between the two holder modules when the projection is displaced into the groove.

2. A system according to claim 1, wherein the respective holder module (1) is provided with such a first coupling member (5a) on a first side of a body (2) included in the holder module and such a second coupling member (5b) on an opposite second side of the body (2).

3. A system according to claim 2, wherein the respective coupling member (5a, 5b) extends over the entire axial length of said body (2).

4. A system according to claim 1, wherein the coupling members (5a, 5b) are provided with mutually co-operating snap-in members (11a, 11b) to allow a coupling member (5a, 5b) of a holder module to engage with snap-in action into the corresponding coupling member (5b, 5a) of another holder module by said mutually co-operating snap-in members.

5. A system according to claim 1, wherein the respective holder modules (1) each two seats (3) which are arranged on a first side of a body (2) included in the respective holder module (1) and which face away from each other, and two seats (3) which are arranged on the opposite side of the body (2) and which face away from each other.

6. A system according to claim 1, wherein the respective seat (3) of each holder module (1) is formed by a resilient, curved tongue (4), which projects laterally from a body (2) included in the holder module.

7. A system according to claim 1, wherein the respective holder module (1) is provided with at least one through hole (15) designed to receive a bolt or screw to fix the holder module to a supporting structural element.

8. A system according to claim 1, wherein the system comprises a mounting module (20), which comprises:
 a clamping mechanism (25) for clamping the mounting module to a supporting structural element, and
 a groove (22), which fits to said projection (6) and which has a dovetail-shaped cross-sectional shape, this groove being tapered in its longitudinal direction as seen in the direction from a first end of the groove (22) to the opposite second end of the groove, said projection (6) being insertable into this groove (22) by insertion of the narrower second end of the projection (6) into an opening (23) at the wider first end of the groove (22) and displaceable into a locking engagement in the groove.

9. A system according to claim 8, wherein the clamping mechanism (25) of the mounting module comprises a resilient locking tongue (27), which projects from a body (21) included in the mounting module at the narrower second end of the groove (22) essentially perpendicularly to the longitudinal direction of the groove and which at its outer end is provided with a downwardly directed locking shoulder (29) for locking engagement with a supporting structural element, the groove (22) and locking tongue (27) of the mounting module being so designed that a gable (13b) of a holder module (1) abuts against the upper side (27a) of the locking tongue when the holder module is connected to the mounting module (20) with the projection (6) of the holder module in locking engagement with the groove (22) of the mounting module so that the holder module (1) thereby obstructs a bending of the locking tongue (27) upwards in relation to the body (21) of the mounting module.

10. A system according to claim 2, wherein the coupling members (5a, 5b) are provided with mutually co-operating snap-in members (11a, 11b) to allow a coupling member (5a, 5b) of a holder module to engage with snap-in action into the corresponding coupling member (5b, 5a) of another holder module by said mutually co-operating snap-in members.

11. A system according to claim 3, wherein the coupling members (5a, 5b) are provided with mutually co-operating snap-in members (11a, 11b) to allow a coupling member (5a, 5b) of a holder module to engage with snap-in action into the corresponding coupling member (5b, 5a) of another holder module by said mutually co-operating snap-in members.

12. A system according to claim 11, wherein the respective holder modules (1) each comprise two seats a) which are arranged on a first side of a body (2) included in the respective holder module (1) and which face away from each other, and two seats (3) which are arranged on the opposite side of the body (2) and which face away from each other.

13. A system according to claim 10, wherein the respective holder modules (1) each comprise two seats (3) which are arranged on a first side of a body (2) included in the respective holder module (1) and which face away from each other, and two seats (3) which are arranged on the opposite side of the body (2) and which face away from each other.

14. A system according to claim 4, wherein the respective holder modules (1) each comprise two seats (3) which are arranged on a first side of a body (2) included in the respective holder module (1) and which face away from each other, and two seats (3) which are arranged on the opposite side of the body (2) and which face away from each other.

15. A system according to claim 3, wherein the respective holder modules (1) each comprise two seats (3) which are arranged on a first side of a body (2) included in the respective, holder module (1) and which face away from each other, and two seats (3) which are arranged on the opposite side of the body (2) and which face away from each other.

16. A system according to claim 2, wherein the respective holder modules (1) each comprise two seats (3) which are arranged on a first side of a body (2) included in the respective holder module (1) and which face away from each other, and two seats (3) which are arranged on the opposite side of the body (2) and which face away from each other.

17. A system according to claim 16, wherein the respective seat (3) of each holder module (1) is formed by a resilient, curved tongue (4), which projects laterally from a body (2) included in the holder module.

18. A system according to claim 15, wherein the respective seat (3) of each holder module (1) is formed by a resilient, curved tongue (4), which projects laterally from a body (2) included in the holder module.

19. A system according to claim 14, wherein the respective seat (3) of each holder module (1) is formed by a resilient, curved tongue (4), which projects laterally from a body (2) included in the holder module.

20. A system according to claim 13, wherein the respective seat (3) of each holder module (1) is formed by a resilient, curved tongue (4), which projects laterally from a body (2) included in the holder module.

* * * * *